June 6, 1950  S. R. BARR  2,510,617
COMBINED SHUTOFF AND METERING VALVE
Filed July 10, 1946

Inventor:
Samuel R. Barr,
by Prowell & Mack
His Attorney.

Patented June 6, 1950

2,510,617

UNITED STATES PATENT OFFICE 2,510,617

COMBINED SHUTOFF AND METERING VALVE

Samuel R. Barr, Bridgeport, Conn., assignor to General Electric Company, a corporation of New York Application July 10, 1946, Serial No. 682,554

1 Claim. (Cl. 277—53)

This invention relates to a combined shut-off and metering valve for controlling the flow of fluids. It is particularly applicable to regulation of the flow of fluid fuel to the combustion chamber of a thermal powerplant, and is well adapted for use as a combined shut-off and throttle valve for a gas turbine powerplant. It has particular utility as a control valve for gas turbine powerplants for the jet propulsion of aircraft.

The present invention comprises an improvement over a somewhat similar valve described in my prior application Serial No. 630,673, filed November 24, 1945, now Patent No. 2,485,349 issued October 18, 1949.

An object of the invention is to provide an improved form of fluid fuel control valve for a thermal powerplant, combining the functions of a positive shut-off valve and a long-range metering device, and having adjustable means for providing the minimum fuel flow required for "idling" or no-load operation of the powerplant.

Another object is to provide a fluid control valve of the type described which is simple in construction and arranged for easy disassembly for inspection and maintenance.

A further object is to provide a valve of the type described having a movable fluid control member which is hydraulically balanced so that a minimum operating force is required.

A still further object is to provide a fluid control valve capable of passing large quantities of fluid with only a small pressure drop across the valve.

Figure 1:
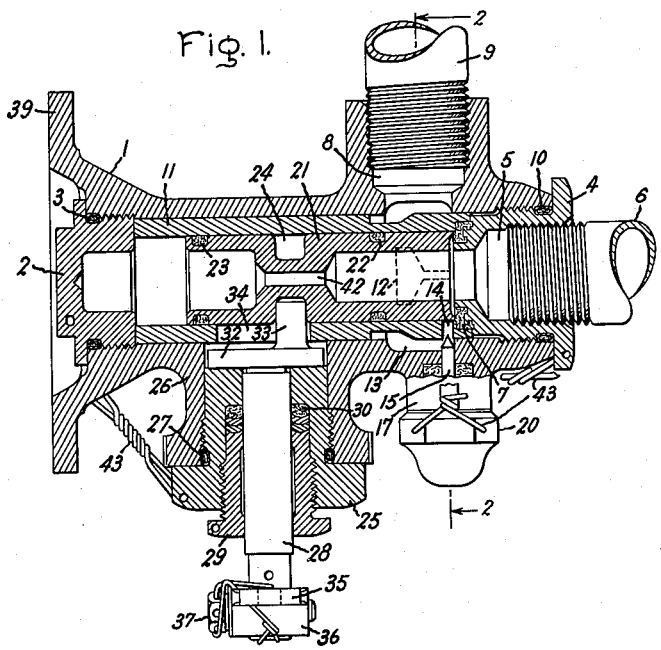
Figure 2:
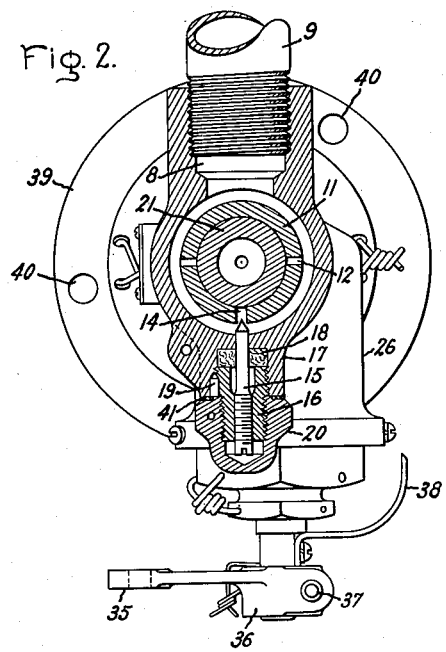

Other objects and advantages will be apparent from the following description taken in connection with the accompanying drawing, in which Fig. 1 is an axial view, in section, of my improved valve, and Fig. 2 is a sectional view taken along the irregular plane 2—2 in Fig. 1.

Referring now to Fig. 1, my valve comprises a housing 1 which is substantially cylindrical and has a central bore extending lengthwise and opening through each end of the housing. The left-end of the housing is closed by means of a plug member 2 threaded into the bore of the housing in a manner which will be obvious from the drawing. The inner end surface of the plug forms an annular shoulder projecting into the bore and serving as a stop for the movable valve member when moved to one extreme of its travel. A suitable resilient packing ring 3 may be interposed between the head of the plug 2 and the bore of the housing so as to provide a fluid seal for the threaded joint therebetween.

The right-hand end of the housing 1 is provided with a bushing 4 which serves a number of functions. The member 4 is threaded into the end of the bore in housing 1 and provided with a packing ring 10 similar to ring 3. Member 4 also has an axial bore 5 which serves as one of the main fluid ports for the valve, and which may be threaded to receive a conduit 6. The annular inner end face of bushing 4 is provided with a resilient ring member 7 which, as shown in Fig. 1, may be of a synthetic rubber molded into suitable grooves machined in the end surface of the bushing. This resilient ring serves a dual purpose noted hereinafter.

In the side wall of housing 1 adjacent the right-hand end thereof is provided another main fluid port 8 communicating with the central bore of the housing and provided with a thread or other suitable coupling means for attaching a fluid conduit 9.

Pressed into the bore of housing 1 is a tubular bushing or sleeve 11, of such a length as to be positioned between the end closure plug 2 and the bushing 4 when both are screwed tightly into place. As will be apparent from Fig. 1, the resilient ring 7 associated with the end face of bushing 4 engages an annular rabbet in the end of bushing 11 so as to provide a fluid seal therebetween.

Adjacent the right-hand end of the tubular bushing 11, but spaced slightly therefrom, are a number of contoured fluid metering ports 12, the plan shape of which is shown by the dotted lines in Fig. 1. The irregular cutting plane 2—2 in Fig. 1 is so selected that Fig. 2 shows a sectional view of these metering ports. It is important to note that there must be more than one of these ports, that they must be equally spaced circumferentially around the bushing 11, and that they must be of equal size and shape, in order that the valve will be completely balanced hydraulically. While only two ports 12 have been shown in the drawings, arranged diametrically opposite each other, it will be obvious that three or more equally spaced ports may be used.

The housing 1 is provided with an annular recess which is sealed on the open side by bushing 11 to define a chamber 13 surrounding the bushing 11 and communicating with both the fluid port 8 and the metering ports 12.

In order that the valve may be used to pass an adjustable minimum amount of fuel required for idling operation of the powerplant, an auxiliary port 14 is provided in the side wall of bushing 11 at a location between the right-hand end of the bushing and the metering ports 12. The effective area of port 14 may be varied by means of a metering pin 15, the arrangement of which may be more readily seen in Fig. 2. Pin 15 threadedly engages a central bore in a bushing 16, which is in turn threaded into a boss 17 formed on the side of housing 1. A suitable packing washer 18 may be compressed by the end surface of bushing 16 so as to cause it to tightly engage the sides of pin 15. Furthermore, bushing 16 may be locked in position relative to housing 1 by means of a dowel pin 19 driven into a drilled hole in the threaded joint, this being a well-known thread locking arrangement. The exterior surface of bushing 16 which projects from housing 1 is threaded to receive a closure cap 20, which may be provided on its exterior surface with a hexagonal section to which a wrench may be applied for removing the cap. A soft aluminum washer 41 may be used to help prevent leakage between cap 20 and boss 17. It will be apparent that by removing cap 20 a screwdriver may be applied to the slot in the exterior threaded end of the pin 15 so that the pin may be adjusted to cause its pointed inner end to move into or away from the bypass port 14. This arrangement permits ready adjustment of the idling flow without disassembly of the valve, except for removal of the cap 20.

The movable fluid control member of my valve is in the form of a cylindrical piston 21 slidably arranged in tubular bushing 11. The right-hand end of piston 21 is provided with a comparatively narrow annular surface arranged to engage the resilient ring 7 when the piston is in its extreme right-hand or closed position. Suitable packing rings 22 and 23 are provided in circumferential grooves in the exterior surface of the piston for the purpose of preventing fluid leakage through the sliding fit provided between the piston 21 and the bore of tubular bushing 11. The piston is provided with a central longitudinally extending passage 42, so that fluid under pressure from the right-hand end of the piston will be communicated to the left-hand end thereof. Thus there will be no resultant force produced by the hydraulic pressure acting on the piston when in operation. An annular recess 24 is provided in the exterior surface of piston 21 at a location adjacent the left-hand end and between the packing rings 22, 23. This recess is provided for engagement by the actuating means now to be described.

The actuating means for positioning the fluid control piston 21 consists of an adapter bushing 25 secured in a boss 26 on the side of housing 1 by means of a threaded joint sealed by a packing ring 27. Rotatably journaled in a central bore of bushing 25 is a control spindle 28 surrounded by a packing gland 29 threaded into adapter 25 and arranged to compress a series of suitable packing rings 30. Carried on the inner end of the actuating spindle is a disk member 32 having integral therewith an axially projecting pintle 33 arranged in eccentric or offset relation relative to the axis of shaft 28. As will be clear from Fig. 1, the end disk 32 is positioned between the inner end surface of adapter 25 and the outer surface of tubular bushing 11. Pintle 33 projects through a side wall opening 34 in bushing 11 and extends into the annular recess 24 in piston 21.

For rotatably positioning the actuating spindle 28, a suitable lever member 35 may be secured by any suitable means to the exterior end of spindle 28. This connection may take the form of a split boss 36, the two portions of which are clamped together, so as to tightly engage the spindle, by means of a clamping screw 37. A pointer 38 may be secured to the side of spindle 28 and arranged to cooperate with suitable markings (not shown) on the boss 26 to give an exterior indication of the position of piston 21. It will be understood that the valve may be actuated by a remote operator through a suitable linkage connected to the arm 35.

Means for supporting the valve assembly may be provided in the form of a circumferential mounting flange 39 formed integral with the left-hand end of housing 1 surrounding the end closure plug 2. Three or more holes 40 in the circumference of flange 39 permit it to be securely bolted to a support, for instance the accessory casing or other frame member of a gas turbine powerplant.

To prevent accidental loosening and loss of the respective parts, the bushings 25, 4, 2, cap 20, etc. may be secured by lock-wires 43 through suitably arranged drilled holes in the parts.

The operation of my improved shut-off and metering valve is as follows. Fig. 1 shows the piston 21 in its extreme right-hand or closed position, with the actuating shaft 28 at approximately 45° to the right of the "neutral" position, and the annular seat formed on the right-hand end of piston 21 firmly engaging the resilient ring 7. Although either the port 5 or the port 8 may be used as the fluid inlet, let it be assumed that fluid enters through the latter. It will be obvious that with piston 21 covering the metering ports 12 and engaging the resilient ring 7, there will be no flow through the valve. Even though the inlet pressure may be of the order of 600 pounds per square inch, or higher, leakage into the port 5 or to the exterior of the valve is effectively prevented by the various packing means described above.

If the actuating spindle 28 is rotated so as to decrease the eccentricity of pintle 33, piston 21 will be retracted slightly so as to immediately uncover the restricted idling port 14, thus permitting a predetermined minimum flow of fuel from the annular chamber 13 to the discharge port 5. If now the piston 21 is retracted still further, the right-hand end will begin to uncover the metering ports 12. It will be obvious that ports 12 can be formed by a suitable process, such as broaching, so as to have any shape necessary to produce a desired schedule of effective total port opening as a function of piston position. When piston 21 reaches the extreme position determined by engagement with the end surface of plug 2, the metering ports 12 are completely uncovered, permitting the maximum rate of flow. This extreme may correspond to a position of shaft 28 about 45° to the left of the "neutral" position. Thus the total movement of shaft 28 is about 90°.

As indicated above, the longitudinal passage extending entirely through the piston 21 provides hydraulic balance so that fluid pressure will produce no net force on the piston to be counteracted by the actuating mechanism. Likewise, it is for reasons of hydraulic balance that it is necessary to use two or more metering ports 12 which are equally spaced circumferentially around the piston 21, and also are of equal size and shape. If these design criteria are not met, fluid entering port 8 under pressure might produce a transverse thrust on piston 21, thus producing excessive friction between the piston and the bore of bushing 11 with the result that the valve might stick, or the operating force required be increased to a prohibitive degree. It will be understood by those familiar with the art pertaining to gas turbine powerplants that it is particularly necessary to have a throttle valve requiring a uniformly small operating force when the valve is arranged to be actuated by a complex automatic control system.

As suggested above, my valve can also be used with port 5 as the inlet and port 8 the outlet, with only very minor differences in the method of operation or the results produced. For instance, fluid entering port 5 under pressure would, when the valve is in closed position as shown in Fig. 1, act on a slightly smaller area on the right-hand end of piston 21 than is exposed to the same fluid pressure at the left-hand end of the piston. As a result there would be a differential force tending to hold the piston against the resilient seat 7. As soon as piston 21 moves to the left away from the seat ring 7, inlet pressure would be applied to the entire area of the right-hand end of the piston, which is equal to the area of the left-hand end and therefore the differential force would disappear. For some applications it may be desirable to thus arrange the valve so that when in closed position the inlet pressure tends to hold the piston 21 in that position. For other applications, the extra initial force required to move the actuating spindle may be undesirable, in which case port 8 may be used as the inlet.

From the above description it will be apparent to those skilled in the mechanical and hydraulic arts that my invention provides a combined shut-off and metering valve with comparatively few, simply manufactured parts, which may be easily assembled, adjusted, and tested, and readily disassembled for servicing and repair. Those familiar with thermal powerplants such as gas turbines for the propulsion of aircraft will appreciate that my valve is particularly well adapted for serving both as a shut-off and throttle valve for high pressure fuel systems while providing ready means for adjusting the amount of fuel supplied to the powerplant for idling operation. Because of the low operating forces required and the freedom from sticking, my valve is particularly useful with thermal powerplants having automatic control systems.

What I claim as new and desire to secure by Letters Patent of the United States, is:

A fluid shut-off and metering valve comprising a substantially cylindrical housing having a central bore opening through one end thereof, a first fluid port in a side wall adjacent the open end and a second side wall opening axially spaced from said port toward the closed end, a tubular bushing disposed in said bore and having a side wall opening aligned with the second side wall opening in the housing and at least two fluid metering ports equally spaced circumferentially around the bushing and adjacent but axially spaced from the bushing end nearest the open end of the housing, the housing and the tubular bushing together defining an annular fluid chamber communicating with the first fluid port and the metering ports, a second bushing member secured to the open end of the housing and adapted to engage the end of the tubular bushing and to form a second fluid port, an elongated cylindrical piston slidably arranged in the tubular bushing and having a longitudinal passage extending entirely therethrough and communicating at one end with the second fluid port, the piston being adapted to cover the metering ports when in closed position and to progressively uncover them as it moves longitudinally in the tubular bushing, said tubular bushing having also a restricted side wall opening communicating with said annular chamber and located between the metering ports and the adjacent end of the bushing whereby the piston establishes a flow path through the restricted opening before the metering ports are uncovered, adjustable means disposed in the housing for varying the effective area of said restricted opening, and piston actuating means supported on the housing with a portion extending through the second side wall opening in the housing and the aligned opening in the tubular bushing and engaging the piston to position it longitudinally.

SAMUEL R. BARR.

REFERENCES CITED

The following references are of record in the file of this patent:

UNITED STATES PATENTS

| Number | Name | Date |
| --- | --- | --- |
| 360,972 | Prescott | Apr. 12, 1887 |
| 1,411,717 | Frost | Apr. 4, 1922 |
| 1,619,054 | Blest | Mar. 1, 1927 |
| 1,814,762 | Mochel | July 14, 1931 |
| 1,907,162 | Webb | May 2, 1933 |
| 2,081,522 | Yarnall | May 25, 1937 |
| 2,117,853 | Queen | May 17, 1938 |